(12) United States Patent
Shim et al.

(10) Patent No.: US 8,047,275 B2
(45) Date of Patent: Nov. 1, 2011

(54) GROUND WATER RESTORATION TYPE TERRESTRIAL HEAT EXCHANGER USING AUTO TEMPERATURE BYPASS APPARATUS

(75) Inventors: Byoung Ohan Shim, Daejeon (KR); Tae Jong Lee, Daejeon (KR)

(73) Assignee: Korea Institute of Geoscience and Mineral Resources (KIGAM), Daejeon (KR)

( * ) Notice: Subject to any disclaimer, the term of this patent is extended or adjusted under 35 U.S.C. 154(b) by 76 days.

(21) Appl. No.: 12/613,392

(22) Filed: Nov. 5, 2009

(65) Prior Publication Data

US 2010/0116459 A1    May 13, 2010

(30) Foreign Application Priority Data

Nov. 10, 2008    (KR) .................. 10-2008-0110887

(51) Int. Cl.
  G05D 23/00    (2006.01)
  F24J 3/08    (2006.01)
  F24H 3/00    (2006.01)
  F28F 27/02    (2006.01)
  F03G 7/00    (2006.01)
  F25D 23/12    (2006.01)

(52) U.S. Cl. ............ 165/297; 165/45; 165/47; 165/103; 60/641.2; 62/260

(58) Field of Classification Search .......... 165/45, 165/47, 50, 100–103, 132, 297, 298; 60/641.1–641.4, 641.6; 405/56; 62/260; 166/57

See application file for complete search history.

(56) References Cited

U.S. PATENT DOCUMENTS

| 4,237,859 A | * | 12/1980 | Goettl | 126/400 |
| 4,375,831 A | * | 3/1983 | Downing, Jr. | 165/48.1 |
| 4,489,568 A | * | 12/1984 | Shapess | 62/324.1 |
| 4,993,483 A | * | 2/1991 | Harris | 165/45 |
| 5,975,192 A | * | 11/1999 | Moratalla et al. | 165/45 |

FOREIGN PATENT DOCUMENTS

| JP | 2004-225936 A | 8/2004 |
| JP | 2007-085644 A | 4/2007 |
| JP | 2008-069576 A | 3/2008 |

* cited by examiner

Primary Examiner — Ljiljana Ciric
Assistant Examiner — Travis Ruby
(74) Attorney, Agent, or Firm — The Webb Law Firm

(57) ABSTRACT

A pipe well; a ground water outlet pipe inserted into the pipe well; a submerged pump installed at the ground water outlet pipe; a heat exchanger in which the ground water is circulated and terrestrial heat of the ground water is heat-exchanged; a collection pipe collects the ground water circulated through the heat exchanger into the pipe well; a connection pipe which connects the submerged pump and the heat exchanger; an auto temperature bypass apparatus which is installed at the connection pipe to automatically bypass the ground water from the connection pipe when a temperature of the ground water arrives at a predetermined value; a discharge pipe through which the ground water bypassed is discharged; and a ground water restoration hole adjacent to the pipe well in which the discharge pipe is inserted to fill up the ground water nearby.

1 Claim, 1 Drawing Sheet

GROUND WATER RESTORATION TYPE TERRESTRIAL HEAT EXCHANGER USING AUTO TEMPERATURE BYPASS APPARATUS

CROSS-REFERENCE(S) TO RELATED APPLICATIONS

The present invention claims priority of Korean Patent Application No. 10-2008-0110887, filed on Nov. 10, 2008 which is incorporated herein by reference.

BACKGROUND OF THE INVENTION

1. Field of the Invention

The present invention relates to a ground water restoration type terrestrial heat exchanger using an auto temperature bypass apparatus; and, more particularly, to a ground water restoration type terrestrial heat exchanger using an auto temperature bypass apparatus, which uses terrestrial heat while preventing a depletion of ground water.

2. Description of Related Art

The ground water restoration type terrestrial heat exchanger is an apparatus which heat-exchanges terrestrial heat from ground water and uses the heat in air-conditioning.

In a conventional ground water restoration type terrestrial heat exchanger, the ground water in a pipe well is pumped up and circulated through the heat exchanger and then collected into the pipe well or consumed.

In case of collecting the circulated ground water into the pipe well, a temperature of the ground water circulated through the heat exchanger is changed, and thus it causes a change in a temperature of the ground water in the pipe well. As described above, if the temperature of the ground water in the pipe well is changed, the performance of the heat exchanger is deteriorated. Therefore, there is a problem that the heat exchanger should be operated at a predetermined regular time intervals. In other words, the predetermined time is required in that the temperature of the ground water in the pipe well returns to its original temperature. Especially, in case of circulating a large quantity of the ground water, much retuning time to the original temperature of the ground water is needed, and thus an operation efficiency of the heat exchanger is deteriorated.

In case of consuming the ground water, since the temperature of the ground water is not changed, it is possible to continuously operate the heat exchanger, but it is apprehended that the ground water is depleted.

SUMMARY OF THE INVENTION

An embodiment of the present invention is directed to providing a ground water restoration type terrestrial heat exchanger using an auto temperature bypass apparatus, which uses terrestrial heat while preventing a depletion of ground water.

Another embodiment of the present invention is directed to providing a ground water restoration type terrestrial heat exchanger using an auto temperature bypass apparatus, which allows the ground water to return to its original temperature when the temperature of the ground water is changed.

To achieve the object of the present invention, the present invention provides a ground water restoration type terrestrial heat exchanger using an auto temperature bypass apparatus, including a pipe well 10 drilled in the ground; a ground water outlet pipe 20 inserted into the pipe well 10 so as to output the ground water; a submerged pump 30 installed at the ground water outlet pipe 20; a heat exchanger 40 in which the ground water pumped out is circulated to terrestrial heat-exchange; a collection pipe 50 connected to the heat exchanger 40 to restore the ground water to the pipe well 10; a connection pipe 60 between the submerged pump 30 and the heat exchanger 40; an auto temperature bypass apparatus 80 installed at the connection pipe 50 so as to automatically bypass the ground water from the connection pipe 50 when a temperature of the ground water arrives at a predetermined value; a discharge pipe 70 connected to the auto temperature bypass apparatus 80 through which the bypassed ground water flows; and a ground water restoration hole 90 adjacent to the pipe well in which the discharge pipe 70 is inserted to fill up the ground water nearby. Preferably, the ground water restoration type terrestrial heat exchanger further includes a filter unit 100 provided at the discharge pipe 80 so as to filter the ground water bypassed.

Preferably, the ground water restoration type terrestrial heat exchanger further includes a booster pump 110 provided at a rear end of the filter unit 100 so as to pressurize the ground water filtered by the filter unit 100 and then pump it into the ground water restoration hole 90.

[Detailed Description of Main Elements]

Figure 1:
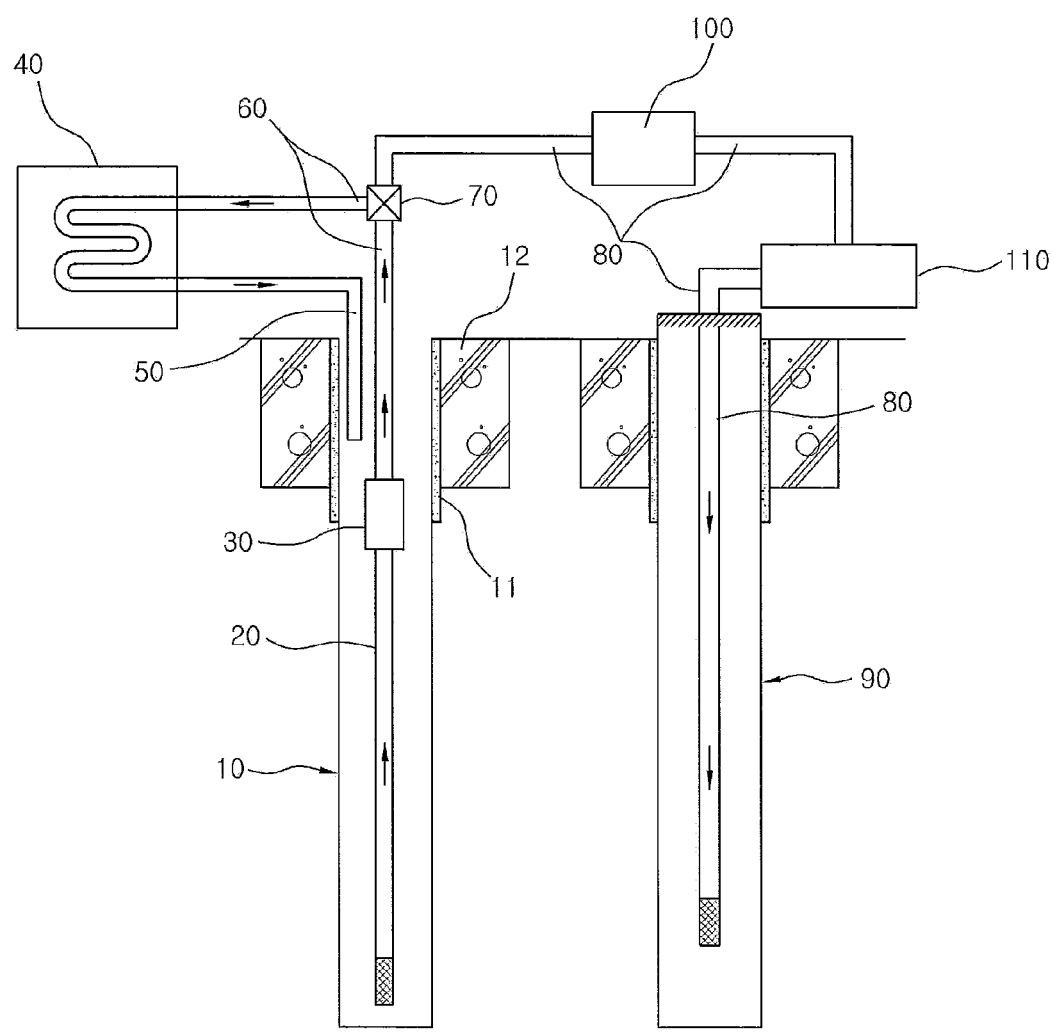
FIG. 1 is a view showing a schematic structure of a ground water restoration type terrestrial heat exchanger using an auto temperature bypass apparatus in accordance with the present invention.

| | |
|---|---|
| 10: | pipe well |
| 20: | ground water outlet pipe |
| 30: | submerged pump |
| 40: | heat exchanger |
| 50: | collection pipe |
| 60: | connection pipe |
| 70: | auto temperature bypass apparatus |
| 80: | discharge pipe |
| 90: | ground water restoration hole |
| 100: | filter unit |
| 110: | booster pump |

DESCRIPTION OF SPECIFIC EMBODIMENTS

The advantages, features and aspects of the invention will become apparent from the following description of the embodiments with reference to the accompanying drawings, which is set forth hereinafter.

FIG. 1 is a view showing a schematic structure of a ground water restoration type terrestrial heat exchanger using an auto temperature bypass apparatus in accordance with the present invention.

A ground water restoration type terrestrial heat exchanger using an auto temperature bypass apparatus according to the present invention includes a pipe well 10, a ground water outlet pipe 20 which is inserted into the pipe well 10, a submerged pump 30 which is installed at the ground water outlet pipe 20, a heat exchanger 40 in which the ground water is circulated and terrestrial heat of the ground water is heat-exchanged, a collection pipe 50 which collects the ground water circulated through the heat exchanger 40 in the pipe well 10, an auto temperature bypass apparatus 70 which is installed at a connection pipe 60 for connecting the submerged pump 30 and the heat exchanger 40 so as to automatically bypass the ground water when a temperature of the ground water arrives at a predetermined value, a discharge pipe 80 through which the ground water bypassed through the auto temperature bypass apparatus 70 is discharged, and a ground water restoration hole 90 which is formed to be adjacent to the pipe well 10 and through which the ground water discharged through the discharge pipe 80 is introduced.

The pipe well 10 is built to obtain the ground water. Generally, the pipe well 10 is constructed by drilling. In case of drilling the pipe well 10 in the soft ground, a casing is inserted into the soft ground and then a grouting is performed around the casing 11 so as to fix the casing 11. The ground water restoration type terrestrial heat exchanger of the present invention is an open type in which the ground water is output through the ground water outlet pipe 20 so as to use a terrestrial heat of the ground water.

The ground water outlet pipe 20 is inserted into a bottom of the pipe well 10 so as to introduce the ground water.

The submerged pump 30 is mounted at the ground water outlet pipe 20 to pump out ground water through the ground water outlet pipe 20.

The heat exchanger 40 exchange the terrestrial heat of the ground water pumped out by the submerged pump 30 while circulation, thereby obtaining the terrestrial heat. The ground water restoration type terrestrial heat exchanger may be used in various applications like air-conditioning.

The collection pipe 50 functions to collect the ground water circulated through the heat exchanger 40 in the pipe well 10.

According to the present invention as described above, the ground water is output from the pipe well 10 so as to obtain the terrestrial heat and then collected again in the pipe well 10, thereby preventing a depletion of the ground water.

The connection pipe 60 connects the submerged pump 30 and the heat exchanger 40.

The auto temperature bypass apparatus 70 is installed at the connection pipe 60.

The auto temperature bypass apparatus 70 installed at the connection pipe 60 is diverged from the connection pipe 60 so as to automatically bypass the ground water when a temperature of the ground water arrives at a predetermined value. If a large quantity of the ground water continues to be pumped out from and return to the pipe well 10, the temperature of the ground water is changed. And if the change in the temperature of the ground water is increased, it is no more possible to use the terrestrial heat. Therefore, the auto temperature bypass apparatus 70 functions to automatically bypass the ground water when a temperature of the ground water arrives at a predetermined value.

The discharge pipe 80 functions to discharge the ground water bypassed from the auto temperature bypass apparatus 70. The ground water discharged through the discharge pipe 80 is supplied into the ground water restoration hole 90 which is formed to be adjacent to the pipe well 10. The discharge pipe 80 is inserted into a bottom of the ground water restoration hole 90.

Since the discharge pipe 80 is inserted into the ground water restoration hole 90, the ground water discharged through the discharge pipe 80 is injected and supplied into the ground water restoration hole 90. At this time, since the discharge pipe 80 provided at the ground water restoration hole 90 is extended to the bottom of the ground water restoration hole 90, a temperature of the supplied ground water into the ground water restoration hole 90 recovers to an original temperature of the ground water. The ground water restoration hole 90 is also constructed by the drilling like the pipe well 10.

In the present invention, in case that the ground water in the pipe well 10 cannot be used in the heat-exchanging with the heat exchanger 40, the ground water is automatically bypassed to the ground water restoration hole 90 so that the temperature of the ground water in the pipe well 10 is recovered to its original temperature, and thus the rapid temperature recovery of the ground water in the pipe well 10 is possible. Further, since the ground water supplied to the ground water restoration hole 90 flows to the pipe well 10, it is possible to continuously maintain the performance of the heat exchanger even when a large quantity of the ground water is pumped out.

Preferably, a filter unit 100 is further provided at the discharge pipe 80 so as to filter foreign substances, rust stains, scales and the like from the ground water which is automatically bypassed through the auto temperature bypass apparatus 70.

And preferably, a booster pump 110 is further provided at a rear end of the filter unit 100 so as to pressurize the ground water filtered by the filter unit 100 and then pump it into the ground water restoration hole 90.

According to the present invention, it is possible to continuously obtain the terrestrial heat from the ground water without the depletion of the ground water. Further, since a filter unit is separately provided so as to filter a foreign substance or a rust stain which may be generated at the ground water outlet pipe, it is possible to continuously operate the ground water restoration type terrestrial heat exchanger without ground water pollution While the present invention has been described with respect to the specific embodiments, it will be apparent to those skilled in the art that various changes and modifications may be made without departing from the spirit and scope of the invention as defined in the following claims.

What is claimed is:

1. A ground water restoration type terrestrial heat exchanger using an auto temperature bypass apparatus, comprising:
    a pipe well drilled in the ground;
    a ground water outlet pipe inserted into the pipe well so as to output ground water from the pipe well;
    a pump installed at the ground water outlet pipe;
    a heat exchanger in which the ground water pumped out is circulated to effect a terrestrial heat-exchange;
    a collection pipe connected to the heat exchanger to restore the ground water to the pipe well;
    a connection pipe connected between the pump and the heat exchanger;
    an auto temperature bypass apparatus installed at the connection pipe so as to automatically bypass the ground water from the connection pipe when a temperature of the ground water arrives at a predetermined value;
    a discharge pipe connected to the auto temperature bypass apparatus through which the bypassed ground water flows;
    a ground water restoration hole adjacent to the pipe well, the discharge pipe being inserted in the ground water restoration hole to restore the ground water nearby the pipe well;
    a filter unit provided at the discharge pipe so as to filter the ground water bypassed; and a booster pump provided downstream of the filter unit.

* * * * *